United States Patent Office 2,709,830
Patented June 7, 1955

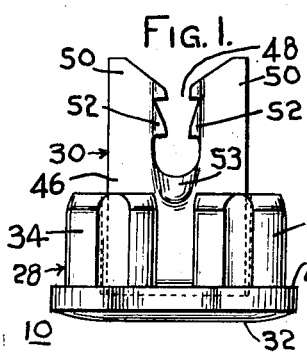
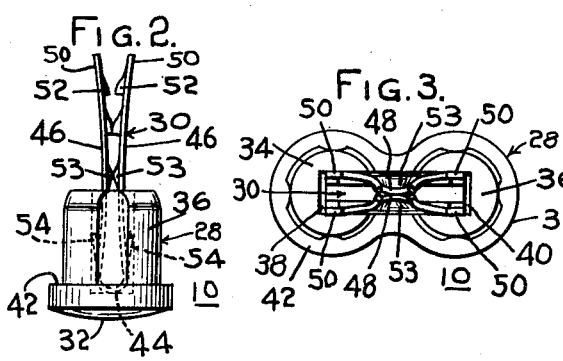
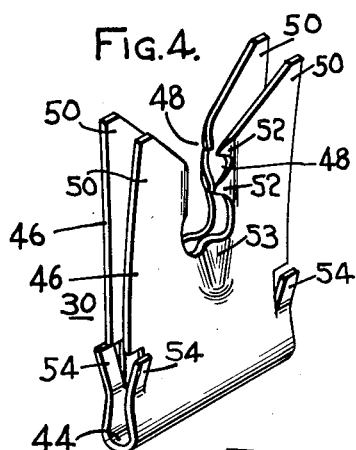
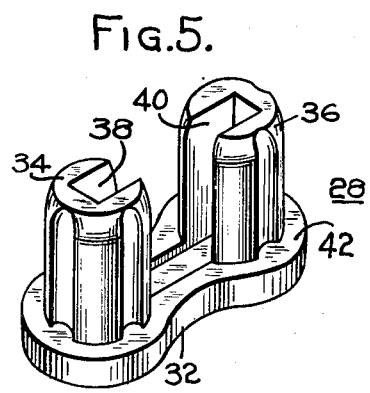
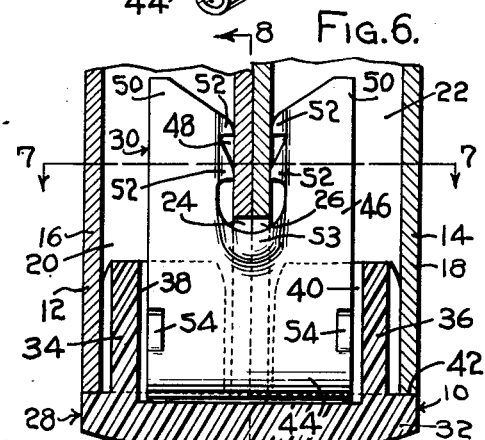
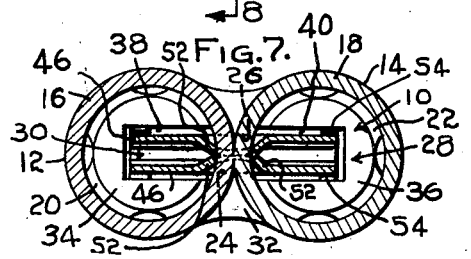
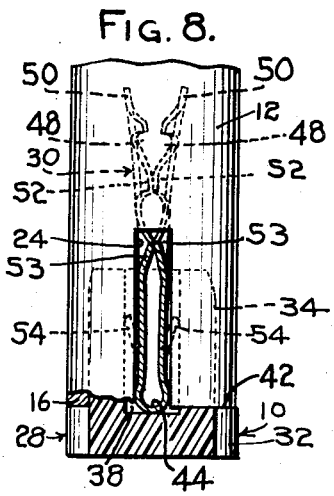
INVENTOR:
PHILIP D. BECKER,
BY Robert E Ross
ATTORNEY.

2,709,830

CLOSURE MEMBER

Philip D. Becker, Hingham, Mass., assignor to United-Carr Fastener Corporation, Cambridge, Mass., a corporation of Massachusetts Application August 8, 1952, Serial No. 303,445

3 Claims. (Cl. 16—42)

This invention relates generally to closure members, and has particular reference to closure members used for insertion into the ends of tubular members such as metal furniture legs.

The object of the invention is to provide a closure member which is adapted to be inserted into the ends of a pair of adjacent tubular members to retain the members in fixed relation to one another.

Another object of the invention is to provide a closure member for assembly into the ends of a pair of adjacent tubular members which is provided with means for entering opposing apertures in the ends of the walls of the tubular members to prevent orbital movement of the tubular members relative to each other.

Other objects of the invention will, in part, be obvious, and will, in part, appear hereinafter.

In the drawing:

Fig. 1 is a view in elevation of a closure member embodying the features of the invention;

Fig. 2 is a view of the closure member of Fig. 1 as seen from the right side;

Fig. 3 is a view of the closure member of Fig. 1 as seen from the top;

Fig. 4 is a perspective view of the tube-engaging portion of the closure member of Fig. 1;

Fig. 5 is a perspective view of the base portion of the closure member of Fig. 1;

Fig. 6 is a view in elevation partly in section, of the closure member of Fig. 1 assembled into a pair of tubular members;

Fig. 7 is a view in section taken on line 7—7 of Fig. 6; and

Fig. 8 is a view in section taken on line 8—8 of Fig. 1.

Referring to the drawing, there is illustrated a closure member 10, which is adapted for assembly into a pair of tubular members 12 and 14 to assist in retaining them in fixed relation to one another. The tubular members may form the leg of an article of furniture or the like (not shown) in which case the closure member 10 also serves as a glide for supporting said article. The tubular members 12 and 14 comprise generally cylindrical metal walls 16 and 18 forming internal bores 20 and 22 which are provided with opposing apertures or slots 24 and 26 in adjacent portions of the ends thereof.

The closure member 10 comprises generally a base member 28 and a tube-engaging member 30 disposed thereon. The base member 28 is preferably formed of a single piece of molded organic plastic such as cellulose acetate, ethyl cellulose, styrene, or plastic of the polyamide or vinyl types. The plastic used should be non-brittle and capable of absorbing shocks due to impact without fracturing. Plastics having these properties and the method of molding them are well known and do not form a part of the present invention. The base member 28 comprises generally a base 32 and a pair of spaced upstanding column-like members 34 and 36 disposed thereon, which have longitudinal apertures 38 and 40 in adjacent sides. The column-like members have a predetermined size such that they are capable of entering the ends of the tubular members 12 and 14 so as to fit snugly therein, and are so disposed on the base that a peripheral portion of the base about the column-like members forms a seating flange 42 against which the ends of the tube walls bear when the closure member is assembled into the tubes.

The tube-engaging member 30 is preferably formed of a single elongated piece of sheet metal which is folded at the medial portion to form a folded end 44 and a pair of contiguous end portions 46. The end portions 46 are each provided with medially disposed longitudinal slots 48, thereby forming pairs of spaced arms 50, which are provided with a longitudinal series of teeth 52 on adjacent edges thereof, and the portions 53 of the tube-engaging member at the end of the slots 48 are dished inwardly and inclined toward each other. To provide means for retaining the tube-engaging member in assembly with the base member, the folded end is provided with a number of projecting tongues 54 which are inclined away from said end.

The tube-engaging member 30 is assembled with the base 28 by inserting the folded end 44 into the slots 38 and 40 so that the tongues 54 engage the plastic walls of the slots to retain the tube-engaging member therein. After such assembly the folded end 44 seats against the base 32 of the base member and extends between the column-like members 34 and 36.

The closure member is assembled with the tubular members by simply inserting the spaced arms 50 into the ends thereof so that the teeth 52 travel up the slots 24 and 26. Before the teeth reach the end of the slots, the portions 53 of the tube-engaging member at the end of the slots 48 enter the slots 24 and 26 in the tubes, and the column-like members 34 and 36 have entered the ends of the tubes, thereby positioning the closure member against lateral movement. Further movement of the closure member causes the teeth to pass beyond the slots 24 and 26 and bite into engagement with the inner surfaces of the tube walls. The closure member is thereby retained in the ends of the tubes. The tubes are retained in superimposed relation and orbital movement of the tubes relative to each other is prevented.

The construction of the fastener utilizes the strength of the metal tube-engaging portion to resist movement of the tubes relative to each other, and the provision of the plastic base portion imparts a noise-reducing feature to the device when the chair or table on which it is assembled is used on floors of tile, concrete, or the like.

Since certain other obvious changes may be made in the device without departing from the scope of the invention, it is intended that all matter contained herein be interpreted in an illustrative and not in a limiting sense.

I claim:

1. A closure member for assembly onto the ends of a pair of tubular members, comprising a base member and a tube-engaging member assembled onto the base and extending upwardly therefrom, said base having a slot-like aperture, said tube-engaging member being formed of a single piece of elongated resilient sheet metal folded at the medial portion to form a pair of contiguous end portions, said end portions having longitudinal slots medially disposed therein to form a pair of spaced arm portions, said folded medial portion being retained in said slot-like aperture and said spaced arm portions extending upwardly therefrom for entry into said tubular members, said spaced arm portions having a series of teeth disposed on adjacent edges thereof for biting engagement with the inner surface of said tubular members.

2. A closure member for assembly onto the ends of a pair of tubular members, comprising a base portion formed of a synthetic organic plastic, and a tube-engaging portion formed of resilient sheet metal, said base portion having a pair of spaced upstanding column members for entering the ends of the tubes, said column members having vertical slots extending to the upper ends thereof, said tube-engaging portion comprising a base-engaging portion disposed in the slots and extending between the columns and having means thereon disposed in biting engagement with the base portion, a tube-engaging portion extending upwardly therefrom beyond the column members, said tube-engaging portion having a bifurcated end forming a pair of spaced tube-engaging arms, said arms having teeth formed on opposing edges thereof for biting engagement with the internal surfaces of said tubes.

3. A tube-engaging member as set forth in claim 2 in which said tube-engaging portion is formed of an elongated piece of sheet metal folded at the medial portion forming a pair of contiguous tube-engaging portions which are provided with slots medially disposed therein and extending to the ends thereof to form said bifurcated end.

References Cited in the file of this patent

UNITED STATES PATENTS

| | | |
|---|---|---|
| 870,770 | Fuller | Nov. 12, 1907 |
| 2,247,975 | Tinnerman | July 1, 1941 |
| 2,546,492 | Booth | Mar. 27, 1951 |
| 2,574,330 | Judd | Nov. 6, 1951 |
| 2,613,957 | Ritter | Oct. 14, 1952 |
| 2,628,384 | Shomber | Feb. 17, 1953 |
| 2,644,978 | Becker | July 14, 1953 |

FOREIGN PATENTS

| | | |
|---|---|---|
| 485,622 | Canada | Aug. 12, 1952 |